United States Patent
Martinez-Bauza et al.

(10) Patent No.: US 8,488,870 B2
(45) Date of Patent: Jul. 16, 2013

(54) MULTI-RESOLUTION, MULTI-WINDOW DISPARITY ESTIMATION IN 3D VIDEO PROCESSING

(75) Inventors: Judit Martinez-Bauza, San Diego, CA (US); Manish Prakash Shiralkar, Clemson, SC (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 12/983,612

(22) Filed: Jan. 3, 2011

(65) Prior Publication Data

US 2012/0014590 A1  Jan. 19, 2012

Related U.S. Application Data

(60) Provisional application No. 61/358,618, filed on Jun. 25, 2010.

(51) Int. Cl.
   *G06K 9/00* (2006.01)
(52) U.S. Cl.
   USPC ............................ 382/154; 348/159; 345/427
(58) Field of Classification Search
   USPC ............................ 382/154; 348/159; 345/427
   See application file for complete search history.

(56) References Cited

U.S. PATENT DOCUMENTS

| | | | |
|---|---|---|---|
| 5,719,954 A | 2/1998 | Onda | |
| 7,512,262 B2 | 3/2009 | Criminisi et al. | |
| 7,558,432 B2 * | 7/2009 | Zaharia et al. | 382/251 |
| 7,683,910 B2 * | 3/2010 | Lu et al. | 345/582 |
| 2002/0106120 A1 * | 8/2002 | Brandenburg et al. | 382/154 |
| 2002/0141635 A1 * | 10/2002 | Swift et al. | 382/154 |
| 2004/0223640 A1 * | 11/2004 | Bovyrin | 382/154 |
| 2004/0240725 A1 * | 12/2004 | Xu et al. | 382/154 |
| 2005/0117019 A1 * | 6/2005 | Lamboray et al. | 348/159 |
| 2005/0285874 A1 * | 12/2005 | Zitnick et al. | 345/592 |
| 2005/0286757 A1 * | 12/2005 | Zitnick et al. | 382/154 |
| 2006/0082575 A1 * | 4/2006 | Auberger et al. | 345/421 |
| 2006/0114253 A1 * | 6/2006 | Zitnick et al. | 345/422 |
| 2007/0286476 A1 | 12/2007 | Kim et al. | |
| 2008/0150945 A1 * | 6/2008 | Wang et al. | 345/427 |
| 2008/0205791 A1 * | 8/2008 | Ideses et al. | 382/285 |

OTHER PUBLICATIONS

Sun et al., "Symmetric Stereo Matching for Occlusion Handling," Microsoft Research Asia, Beijing, P.R. China, Microsoft Research, Redmond, WA, USA, 8 pp, 2005.

Anonymous: "Poster Sessions Schedule", International Workshop on Very Low Bitrate Video Coding, Oct. 11, 2001, XP002661654, Retrieved from the Internet: URL:http://www.image.ntua.gr/events/vlbvO1/htmldocs/poster-sessions.htm [retrieved on Sep. 21, 2011].

(Continued)

*Primary Examiner* — Hadi Akhavannik
(74) *Attorney, Agent, or Firm* — Donald C. Kordich

(57) ABSTRACT

A disparity value between corresponding pixels in a stereo pair of images, where the stereo pair of images includes a first view and a second view of a common scene, can be determined based on identifying a lowest aggregated matching cost for a plurality of support regions surrounding the pixel under evaluation. In response to the number of support regions having a same disparity value being greater than a threshold number, a disparity value indicator for the pixel under evaluation can be set to the same disparity value.

20 Claims, 10 Drawing Sheets

OTHER PUBLICATIONS

Atzpadin N, et al., "Stereo Analysis by Hybrid Recursive Matching for Real-Time Immersive Video Conferencing", IEEE Transactions on Circuits and Systems for Video Technology, Mar. 1, 2004, pp. 321-334, vol. 14, No. 3, XP011108798, IEEE Service Center, Piscataway, NJ, US ISSN: 1051-8215, DOI: 10.1109/TCSVT.2004. 823391.

International Search Report and Written Opinion—PCT/US2011/041847—ISA/EPO—Nov. 3, 2011.

Zhang, et al., "An efficient hierarchical disparity estimation algorithm for stereoscopic video coding", Circuits and Systems, IEEE APCCAS 2000, The 2000 IEEE Asia-Pacific Conference On Dec. 4-6, 2000, Piscataway, NJ, USA, IEEE, Piscataway, NJ, USA, Dec. 4, 2000, pp. 744-747, XP010537720, ISBN: 978-0-7803-6253-6.

Zhang, "Hierarchical Block-Based Disparity Estimation using Mean Absolute Difference and Dynamic Programming", International Workshop on Very Low Bitrate Video Coding, Oct. 11, 2001, XP002659573, Athens, Greece Retrieved from the Internet: URL:http://citeseerx.ist.psu.edu/viewdoc/download?doi=10.1.1.19. 6945&rep=repl&type=pdf [retrieved on Sep. 21, 2011].

* cited by examiner

| | | | | | | | | | | | | | | | | |
|---|---|---|---|---|---|---|---|---|---|---|---|---|---|---|---|---|
| L4 | 3 | | | | | | | | | | | | | | | |
| L3 | 5 | | | | | | | 3 | | | | | | | | |
| L2 | 9 | | | 7 | | | | 5 | | | | 3 | | | | |
| L1 | 17 | | 15 | | 13 | | 11 | | 9 | | 7 | | 5 | | 3 | |
| L0 | 33 | 31 | 29 | 27 | 25 | 23 | 21 | 19 | 17 | 15 | 13 | 11 | 9 | 7 | 5 | 3 |

FIG. 7

MULTI-RESOLUTION, MULTI-WINDOW DISPARITY ESTIMATION IN 3D VIDEO PROCESSING

This application claims the benefit of U.S. Provisional Application 61/358,618, filed Jun. 25, 2010, the entire contents of which are incorporated herein by reference in its entirety.

TECHNICAL FIELD

This disclosure relates generally to processing and rendering of multimedia data and, more particularly, processing and rendering of three-dimensional (3D) picture and video data.

BACKGROUND

Computational complexity of stereo video processing is important in rendering of three-dimensional (3D) graphics and, specifically, in visualization of 3D scenes in low-power (e.g., battery-powered) devices, or devices with limited computation resources, such as mobile phones, mobile media players, personal digital assistant (PDA) devices, and the like. Visualization of 3D scenes may be useful in presentation of some movies, video games, user interfaces, and other 3D graphics applications.

In general, some difficulties in rendering of 3D graphics on a stereo-enabled display (e.g., auto-stereoscopic or stereoscopic display) may come from efficiency and reality aspects of the stereo video processing. Limited computational resources of the low-power devices may cause rendering of 3D graphics to be an excessively time-consuming routine.

SUMMARY

This disclosure describes techniques for determining a disparity value between corresponding pixels in a stereo pair of images, where the stereo pair of images includes a first view and a second view of a common scene. The disparity value generally describes the horizontal offset of a pixel in one image relative to a corresponding pixel in the other image to produce a 3D effect. A plurality of determined disparity values for the stereo pair of images can be stored in a data structure referred to as a disparity map. Based on one image of the stereo pair and a disparity map, a 3D video rendering device can render a 3D image, such as a frame of 3D video. Aspects of the present disclosure may achieve a relatively high level of quality for a disparity map in a computationally efficient manner that can be implemented in real-time by a variety of computing devices, but which may be especially useful in computational resource-limited devices, such as battery-powered devices.

In one example, a method includes: for a pixel under evaluation in a first image, identifying a plurality of support regions, wherein each of the support regions identifies one or more pixels around the pixel under evaluation in the first image; for each of the support regions, determining a disparity value that provides a lowest aggregated matching cost, wherein the aggregated matching cost is a difference between pixel values of pixels in the first image and corresponding pixels in a second image, and wherein the first image and the second image form a stereo image pair; in response to a number of support regions having a same disparity value being greater than a threshold number, setting a disparity value indicator for the pixel under evaluation to the same disparity value.

In another example, video processing device includes: an image input interface configured to receive a first image and a second image, wherein the first image and the second image form a stereo image pair; a disparity calculation unit configured to: for a pixel under evaluation in the first image, identify a plurality of support regions, wherein each of the support regions identifies one or more pixels around the pixel under evaluation; for each of the support regions, determine a disparity value that provides a lowest aggregated matching cost, wherein the aggregated matching cost is a difference between pixel values of pixels in the first image and corresponding pixels in the second image; in response to a number of support regions having a same disparity value being greater than a threshold number, set a disparity value indicator for the pixel under evaluation to the same disparity value; and an output interface configured to output a disparity map comprising the same disparity value.

In another example, an apparatus for generating three-dimensional (3D) image data includes: means for identifying a plurality of support regions for a pixel under evaluation in a first image, wherein each of the support regions identifies one or more pixels around the pixel under evaluation in the first image; means for determining a disparity value that provides a lowest aggregated matching cost for each of the support regions, wherein the aggregated matching cost is a difference between pixel values of pixels in the first image and corresponding pixels in a second image, and wherein the first image and the second image form a stereo image pair; and, means for setting a disparity value indicator for the pixel under evaluation to the same disparity value in response to a number of support regions having a same disparity value being greater than a threshold number.

In another example, a non-transitory, computer readable storage medium tangibly stores one or more instructions, which when executed by one or more processors cause the one or more processors to: for a pixel under evaluation in a first image, identify a plurality of support regions, wherein each of the support regions identifies one or more pixels around the pixel under evaluation in the first image; for each of the support regions, determine a disparity value that provides a lowest aggregated matching cost, wherein the aggregated matching cost is a difference between pixel values of pixels in the first image and corresponding pixels in a second image, and wherein the first image and the second image form a stereo image pair; in response to a number of support regions having a same disparity value being greater than a threshold number, set a disparity value indicator for the pixel under evaluation to the same disparity value.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 7 is a table of example window sizes for use with a multi-resolution, multi-window approach described in this disclosure.

DETAILED DESCRIPTION

Figure 1:
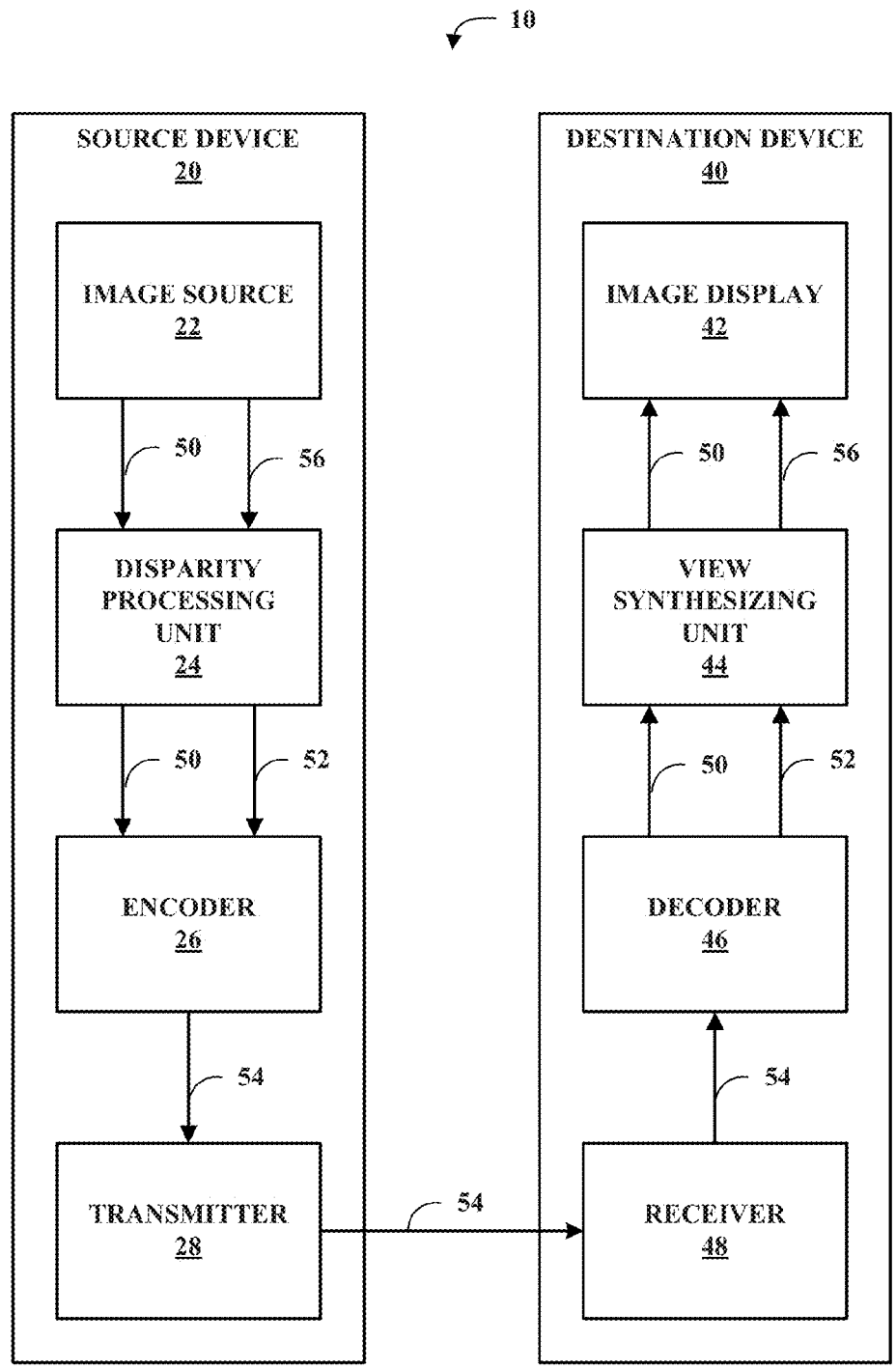
FIG. 1 is a block diagram illustrating an example system in which a source device sends three-dimensional (3D) image data to a destination device.

Estimating disparity maps is a sub-process in the larger process of rendering three-dimensional (3D) images, such as 3D video frames. In newer, more advanced applications such as high definition 3D television, however, a disparity map with more information is often preferred, and sometimes necessary, for producing high quality 3D images. A 3D image rendering process can tolerate some errors and inaccuracy in the disparity estimation process, but a disparity map with too many errors or too many inaccuracies may result in poor image quality. A better disparity map generally correlates to better 3D image rendering, but often times the best disparity calculation algorithms are so complex that they cannot be implemented in real-time or can only be implemented in real-time by devices with significant processing resources. Aspects of the present disclosure may achieve a relatively high level of quality for a disparity map in a computationally efficient manner that can be implemented in real-time by a variety of computing devices, but which may be especially useful in computational resource-limited devices, such as battery-powered devices.

Aspects of this disclosure include techniques for calculating disparity values for two images of a stereo pair of images, where the stereo pair of images includes a first image and a second image of a common scene. The first and second images may throughout this disclosure also be referred to as left and right images or left and right views. The first and second images of the stereo pair can be displayed simultaneously or in rapid succession to create a scene with 3D objects.

The term "disparity" as used in this disclosure generally describes the horizontal offset of a pixel in one image relative to a corresponding pixel in the other image to produce a 3D effect. Corresponding pixels, as used in this disclosure, generally refers to pixels (one in a left image and one in a right image) that are associated with the same point in the 3D object when the left image and right image are synthesized to render the 3D image.

A plurality of disparity values for a stereo pair of images can be stored in a data structure referred to as a disparity map. The disparity map associated with the stereo pair of images represents a two-dimensional (2D) function, d(x, y), that maps pixel coordinates (x, y) in the first image to disparity values (d), such that the value of d at any given (x, y) coordinate in a first image corresponds to the shift in the x-coordinate that needs to be applied to a pixel at coordinate (x, y) in the second image to find the corresponding pixel in the second image. For example, as a specific illustration, a disparity map may store a d value of 6 for a pixel at coordinates (250, 150) in the first image. In this illustration, given the d value of 6, data describing pixel (250, 150), such as chroma and luminance values, in the first image, occurs at pixel (256, 150) in the second image.

The elemental information available in a 2D image is the color value of each pixel. Therefore, one technique for identifying corresponding pixels is to look for the best match of the color value of every pixel in a first image (also called a reference image) among the pixels of a second image (also called a target image), where the target image refers to the companion image in the stereo pair of images. The target image can be one of a left or right image, and the reference image can be the other of the left or right image. As a rectified stereo pair is being considered, the search space in the target image can be limited to the pixels in the same line as in the reference image. This technique, however, assumes that the color values of the pixels associated with the same point in the object are the same, which is not always a correct assumption. For example, object surfaces generally do not reflect light uniformly in all directions and the two image capture-sensors used to acquire the stereo set may have different colorimetric calibrations. Additionally, the same color value may be found in several pixels along the line, providing several potential matches. Further, a particular pixel or group of pixels might be occluded in the target image, meaning that they are behind an object in the reference image and thus not visible in the 3D image. These factors may make such color-matching techniques highly prone to error.

Aspects of the present disclosure may improve upon simple color-matching techniques by utilizing a multi-resolution, multi-window algorithm to compute disparity values for a disparity map. Aspects of the present disclosure include techniques for determining disparity values that may have computational complexity and memory requirements well suited for embedded real-time application while still offering a high level of accuracy.

FIG. 1 is a block diagram illustrating an example system 10 for implementing aspects of the present disclosure. As shown in FIG. 1, system 10 may include a source device 20 with image source 22, disparity processing unit 24, encoder 26, and transmitter 28, and may further include a destination device 40 with image display 42, view synthesizing unit 44, decoder 46, and receiver 48. In the example of FIG. 1, destination device 40 receives encoded image data 54 from source device 20. Source device 20 and/or destination device 40 may comprise wireless communication devices, such as wireless handsets, so-called cellular or satellite radiotelephones, or any wireless devices that can communicate picture and/or video information over a communication channel, in which case the communication channel may comprise a wireless communication channel. Destination device 40 may be referred to as a three-dimensional (3D) display device or a 3D rendering device.

Image source 22 provides a stereo pair of images, including first view 50 and second view 56, to disparity processing unit 24. Disparity processing unit 24 uses first view 50 and second view 56 to generate 3D processing information 52. Disparity processing unit 24 transfers the 3D processing information 52 and one of the two views (first view 50 in the example of FIG. 1) to encoder 26, which encodes first view 50 and the 3D processing information 52 to form encoded image data 54. Transmitter 28 transmits encoded image data 54 to destination device 40.

Receiver 48 receives encoded image data 54 from transmitter 28. Decoder 46 decodes the encoded image data 54 to extract a first view 50 and 3D processing information 52. Based on the first view 50 and the 3D processing information 52, view synthesizing unit 44 can reconstruct the second view 56. Based on the first view 50 and the second view 56, image display 42 can render a three-dimensional image. Although not shown in FIG. 1, first view 50 and second view 56 may undergo additional processing at either source device 20 or destination device 40. Therefore, in some examples, the first view 50 that is received by view synthesizing unit 44 or the first view 50 and second view 56 that are received by image display 42 may actually be modified versions of the first view 50 and second view 56 received from image source 56.

The 3D processing information 52 may, for example, include a disparity map determined in accordance with aspects of this disclosure, or may contain depth information based on a disparity map determined in accordance with aspects of this disclosure. Various techniques exist for determining depth information based on disparity information, and vice versa. Thus, whenever the present disclosure discusses encoding, decoding, or transmitting disparity information, it is also contemplated that depth information based on the disparity information might be encoded, decoded, or transmitted instead.

Aspects of this disclosure generally concern calculation of disparity values for a disparity map for a set of stereo images and are not necessarily limited to wireless applications or settings. For example, aspects of this disclosure may be applied to over-the-air television broadcasts, cable television transmissions, satellite television transmissions, Internet video transmissions, encoded digital video that is encoded onto a storage medium, or other scenarios. Accordingly, the communication channel may comprise any combination of wireless or wired media suitable for transmission of encoded video and/or picture data.

Image source 22 may comprise an image sensor array, e.g., a digital still picture camera or digital video camera, a computer-readable storage medium comprising one or more stored images, an interface for receiving digital images from an external source, a processing unit that generates digital images such as by executing a video game or other interactive multimedia source, or other sources of image data. Image source 22 may generally correspond to a source of any one or more of captured, pre-captured, and/or computer-generated images. In some examples, image source 22 may correspond to a camera of a cellular (i.e., mobile) telephone. In general, references to images in this disclosure include both still pictures as well as frames of video data. Thus, aspects of this disclosure may apply both to still digital pictures as well as frames of captured digital video data or computer-generated digital video data.

Image source 22 provides image data for a stereo pair of images 50 and 56 to disparity processing unit 24 for calculation of disparity values between the images. The stereo pair of images 50 and 56 comprises a first view 50 and a second view 56. Disparity processing unit 24 may be configured to automatically calculate disparity values for the stereo pair of images 50 and 56, which in turn can be used to calculate depth values for objects in a 3D image. For example, image source 22 may capture two views of a scene at different perspectives, and then calculate depth information for objects in the scene based on a determined disparity map. In various examples, image source 22 may comprise a standard two-dimensional camera, a two camera system that provides a stereoscopic view of a scene, a camera array that captures multiple views of the scene, or a camera that captures one view plus depth information.

Although image source 22 may provide multiple views (i.e. first view 50 and second view 56), disparity processing unit 24 may calculate disparity values based on the multiple views, and source device 20 may transmit only a first view 50 plus 3D processing information 52 (i.e. the disparity map or depth information for each pair of views of a scene determined from the disparity map). For example, image source 22 may comprise an eight camera array, intended to produce four pairs of views of a scene to be viewed from different angles. Source device 20 may calculate disparity information or depth information for each pair and transmit only one image of each pair plus the disparity information or depth information for the pair to destination device 40. Thus, rather than transmitting eight views, source device 20 may transmit four views plus depth/disparity information (i.e. 3D processing information 52) for each of the four views in the form of a bitstream including encoded image data 54, in this example. In some examples, disparity processing unit 24 may receive disparity information for an image from a user or from another external device.

Disparity processing unit 24 passes first view 50 and 3D processing information 52 to encoder 26. 3D processing information 52 may comprise a disparity map for a stereo pair of images 50 and 56. Encoder 26 forms encoded image data 54, which includes encoded image data for first view 50 along with the 3D processing information 52. In some examples, encoder 26 may apply various lossless or lossy coding techniques to reduce the number of bits needed to transmit encoded image data 54 from source device 20 to destination device 40. Encoder 26 passes encoded image data 54 to transmitter 28.

When first view 50 is a digital still picture, encoder 26 may be configured to encode the first view 50 as, for example, a Joint Photographic Experts Group (JPEG) image. When first view 50 is a frame of video data, encoder 26 may be configured to encode first view 50 according to a video coding standard such as, for example Motion Picture Experts Group (MPEG), MPEG-2, International Telecommunication Union (ITU) H.263, ITU-T H.264/MPEG-4, H.264 Advanced Video Coding (AVC), ITU-T H.265, or other video encoding standards. The ITU-T H.264/MPEG-4 (AVC) standard, for example, was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Disparity processing unit 24 may generate 3D processing information 52 in the form of a disparity map. Encoder 26 may be configured to encode the disparity map as part of 3D content transmitted in a bitstream as encoded image data 54. This process can produce one disparity map for the one captured view or disparity maps for several transmitted views. Encoder 26 may receive one or more views and the disparity maps, and code them with video coding standards like H.264/AVC, MVC, which can jointly code multiple views, or scalable video coding (SVC), which can jointly code depth and texture.

When first view 50 corresponds to a frame of video data, encoder 26 may encode first view 50 in an intra-prediction mode or an inter-prediction mode. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction and 16 pixels in a horizontal direction. Likewise, an N×N block generally has N pixels in a vertical direction and N pixels in a horizontal direction, where N represents a positive integer value that may be greater than 16. The pixels in a block may be arranged in rows and columns. Blocks may also be N×M, where N and M are integers that are not necessarily equal.

Block sizes that are less than 16 by 16 may be referred to as partitions of a 16 by 16 macroblock. Likewise, for an N×N block, block sizes less than N×N may be referred to as partitions of the N×N block. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered to be video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence or superframe, or another independently decodable unit defined according to applicable coding techniques.

In general, macroblocks and the various sub-blocks or partitions may all be considered to be video blocks. In addition, a slice may be considered to be a series of video blocks, such as macroblocks and/or sub-blocks or partitions. In general a macroblock may refer to a set of chrominance and luminance values that define a 16 by 16 area of pixels. A luminance block may comprise a 16 by 16 set of values, but may be further partitioned into smaller video blocks, such as 8 by 8 blocks, 4 by 4 blocks, 8 by 4 blocks, 4 by 8 blocks or other sizes. Two different chrominance blocks may define color for the macroblock, and may each comprise 8 by 8 sub-sampled blocks of the color values associated with the 16 by 16 area of pixels. Macroblocks may include syntax information to define the coding modes and/or coding techniques applied to the macroblocks. Macroblocks or other video blocks may be grouped into decodable units such as slices, frames or other independent units. Each slice may be an independently decodable unit of a video frame. Alternatively, frames themselves may be decodable units, or other portions of a frame may be defined as decodable units.

As noted above, image source 22 may provide two views of the same scene to disparity processing unit 24 for the purpose of generating 3D processing information 52. In such examples, encoder 26 may encode only one of the views along with the 3D processing information 56. In general, source device 20 can be configured to send a first image 50 along with 3D processing information 52 to a destination device, such as destination device 40. Sending only one image along with a disparity map or depth map may reduce bandwidth consumption and/or reduce storage space usage that may otherwise result from sending two encoded views of a scene for producing a 3D image.

Transmitter 28 may send a bitstream including encoded image data 54 to receiver 48 of destination device 40. For example, transmitter 28 may encapsulate encoded image data 54 in a bitstream using transport level encapsulation techniques, e.g., MPEG-2 Systems techniques. Transmitter 28 may comprise, for example, a network interface, a wireless network interface, a radio frequency transmitter, a transmitter/receiver (transceiver), or other transmission unit. In other examples, source device 20 may be configured to store the bitstream including encoded image data 54 to a physical medium such as, for example, an optical storage medium such as a compact disc, a digital video disc, a Blu-Ray disc, flash memory, magnetic media, or other storage media. In such examples, the storage media may be physically transported to the location of destination device 40 and read by an appropriate interface unit for retrieving the data. In some examples, the bitstream including encoded image data 54 may be modulated by a modulator/demodulator (MODEM) before being transmitted by transmitter 28.

After receiving the bitstream with encoded image data 54 and decapsulating the data, in some examples, receiver 48 may provide encoded image data 54 to decoder 46 (or to a MODEM that demodulates the bitstream, in some examples). Decoder 46 decodes first view 50 as well as 3D processing information 52 from encoded image data 54. For example, decoder 46 may recreate first view 50 and a disparity map for first view 50 from the 3D processing information 52. After decoding of the disparity maps, a view synthesis algorithm can be implemented to generate the texture for other views that have not been transmitted. Decoder 46 may also send first view 50 and 3D processing information 52 to view synthesizing unit 44. View synthesizing unit 44 recreates the second view 56 based on the first view 50 and 3D processing information 52.

In general, the human vision system (HVS) perceives depth based on an angle of convergence to an object. Objects relatively nearer to the viewer are perceived as closer to the viewer due to the viewer's eyes converging on the object at a greater angle than objects that are relatively further from the viewer. To simulate three dimensions in multimedia such as pictures and video, two images are displayed to a viewer, one image (left and right) for each of the viewer's eyes. Objects that are located at the same spatial location within the image will be generally perceived as being at the same depth as the screen on which the images are being displayed.

To create the illusion of depth, objects may be shown at slightly different positions in each of the images along the horizontal axis. The difference between the locations of the objects in the two images is referred to as disparity. In general, to make an object appear closer to the viewer, relative to the screen, a negative disparity value may be used, whereas to make an object appear further from the user relative to the screen, a positive disparity value may be used. Pixels with positive or negative disparity may, in some examples, be displayed with more or less resolution to increase or decrease sharpness or blurriness to further create the effect of positive or negative depth from a focal point.

View synthesis can be regarded as a sampling problem which uses densely sampled views to generate a view in an arbitrary view angle. However, in practical applications, the storage or transmission bandwidth required by the densely sampled views may be large. Hence, research has been performed with respect to view synthesis based on sparsely sampled views and their depth maps. Although differentiated in details, those algorithms based on sparsely sampled views are mostly based on 3D warping. In 3D warping, given the depth and the camera model, a pixel of a reference view may be first back-projected from the 2D camera coordinate to a point P in the world coordinates. The point P may then be projected to the destination view (the virtual view to be generated). The two pixels corresponding to different projections of the same object in world coordinates may have the same color intensities.

View synthesizing unit 44 may be configured to calculate disparity values for objects (e.g., pixels, blocks, groups of pixels, or groups of blocks) of an image based on depth values for the objects or may receive disparity values encoded in the bit stream with encoded image data 54. View synthesizing unit 44 may use the disparity values to produce a second view 56 from the first view 50 that creates a three-dimensional effect when a viewer views first view 50 with one eye and second view 56 with the other eye. View synthesizing unit 44 may pass first view 50 and second view 56 to image display 42 for display to a user.

Image display 42 may comprise a stereoscopic display or an autostereoscopic display. In general, stereoscopic displays simulate three-dimensions by displaying two images while a viewer wears a head mounted unit, such as goggles or glasses, that direct one image into one eye and a second image into the other eye. In some examples, each image is displayed simultaneously, e.g., with the use of polarized glasses or color-filtering glasses. In some examples, the images are alternated rapidly, and the glasses or goggles rapidly alternate shuttering, in synchronization with the display, to cause the correct image to be shown to only the corresponding eye. Auto-stereoscopic displays do not use glasses but instead may direct the correct images into the viewer's corresponding eyes. For example, auto-stereoscopic displays may be equipped with cameras to determine where a viewer's eyes are located and mechanical and/or electronic means for directing the images to the viewer's eyes.

View synthesizing unit 44 may be configured with depth values for behind the screen, at the screen, and in front of the screen, relative to a viewer. View synthesizing unit 44 may be configured with functions that map the depth of objects represented in encoded image data 54 to disparity values. Accordingly, view synthesizing unit 44 may execute one of the functions to calculate disparity values for the objects. After calculating disparity values for objects of first view 50 based on 3D processing information 52, view synthesizing unit 44 may produce second view 56 from first view 50 and the disparity values.

View synthesizing unit 44 may be configured with maximum disparity values for displaying objects at maximum depths in front of or behind the screen. In this manner, view synthesizing unit 44 may be configured with disparity ranges between zero and maximum positive and negative disparity values. The viewer may adjust the configurations to modify the maximum depths in front of or behind the screen objects are displayed by destination device 44. For example, destination device 40 may be in communication with a remote control or other control unit that the viewer may manipulate. The remote control may comprise a user interface that allows the viewer to control the maximum depth in front of the screen and the maximum depth behind the screen at which to display objects. In this manner, the viewer may be capable of adjusting configuration parameters for image display 42 in order to improve the viewing experience.

By being configured with maximum disparity values for objects to be displayed in front of the screen and behind the screen, view synthesizing unit 44 may be able to calculate disparity values based on 3D processing information 52 using relatively simple calculations. For example, view synthesizing unit 44 may be configured with functions that map depth values to disparity values. The functions may comprise linear relationships between the depth and one disparity value within the corresponding disparity range, such that pixels with a depth value in the convergence depth interval are mapped to a disparity value of zero while objects at maximum depth in front of the screen are mapped to a minimum (negative) disparity value, thus shown as in front of the screen, and objects at maximum depth, thus shown as behind the screen, are mapped to maximum (positive) disparity values for behind the screen.

In one example for real-world coordinates, a depth range can be, e.g., [200, 1000] and the convergence depth distance can be, e.g., around 400. Then the maximum depth in front of the screen corresponds to 200 and the maximum depth behind the screen is 1000 and the convergence depth interval can be, e.g., [395, 405]. However, depth values in the real-world coordinate system might not be available or might be quantized to a smaller dynamic range, which may be, for example, an eight-bit value (ranging from 0 to 255). In some examples, such quantized depth values with a value from 0 to 255 may be used in scenarios when the depth map is to be stored or transmitted or when the depth map is estimated. A typical depth-image based rendering (DIBR) process may include converting low dynamic range quantized depth map to a map in the real-world depth map, before the disparity is calculated. Note that, conventionally, a smaller quantized depth value corresponds to a larger depth value in the real-world coordinates. In the techniques of this disclosure, however, it is not necessary to do this conversion; thus, it is not necessary to know the depth range in the real-world coordination or the conversion function from a quantized depth value to the depth value in the real-world coordination. Considering an example disparity range of $[-dis_n, dis_p]$, when the quantized depth range includes values from $d_{min}$ (which may be 0) to $d_{max}$ (which may be 255), a depth value $d_{min}$ is mapped to $dis_p$ and a depth value of $d_{max}$ (which may be 255) is mapped to $-dis_n$. Note that $dis_n$ is positive in this example. Assume that the convergence depth map interval is $[d_0-\delta, d_0+\delta]$, then a depth value in this interval is mapped to a disparity of 0. In general, in this disclosure, the phrase "depth value" refers to the value in the lower dynamic range of $[d_{min}, d_{max}]$. The $\delta$ value may be referred to as a tolerance value, and need not be the same in each direction. That is, $d_0$ may be modified by a first tolerance value $\delta_1$ and a second, potentially different, tolerance value $\delta_2$, such that $[d_0-\delta_2, d_0+\delta_1]$ may represent a range of depth values that may all be mapped to a disparity value of zero.

In this manner, destination device 40 may calculate disparity values without using more complicated procedures that take account of additional values such as, for example, focal length, assumed camera parameters, and real-world depth range values. Thus, as opposed to some techniques for calculating disparity that rely on focal length values that describe the distance from the camera to the object, depth range that describes actual distance between the camera and various objects, distance between two cameras, viewing distance between a viewer and the screen, and width of the screen, and camera parameters including the intrinsic and extrinsic parameters, the techniques of this disclosure, in various examples, may provide a relatively simple procedure for calculating a disparity value of any pixel, e.g., based on a given disparity range for all the pixels or objects, and the depth (quantized or in the lower dynamic range) of the pixel.

Figure 2:
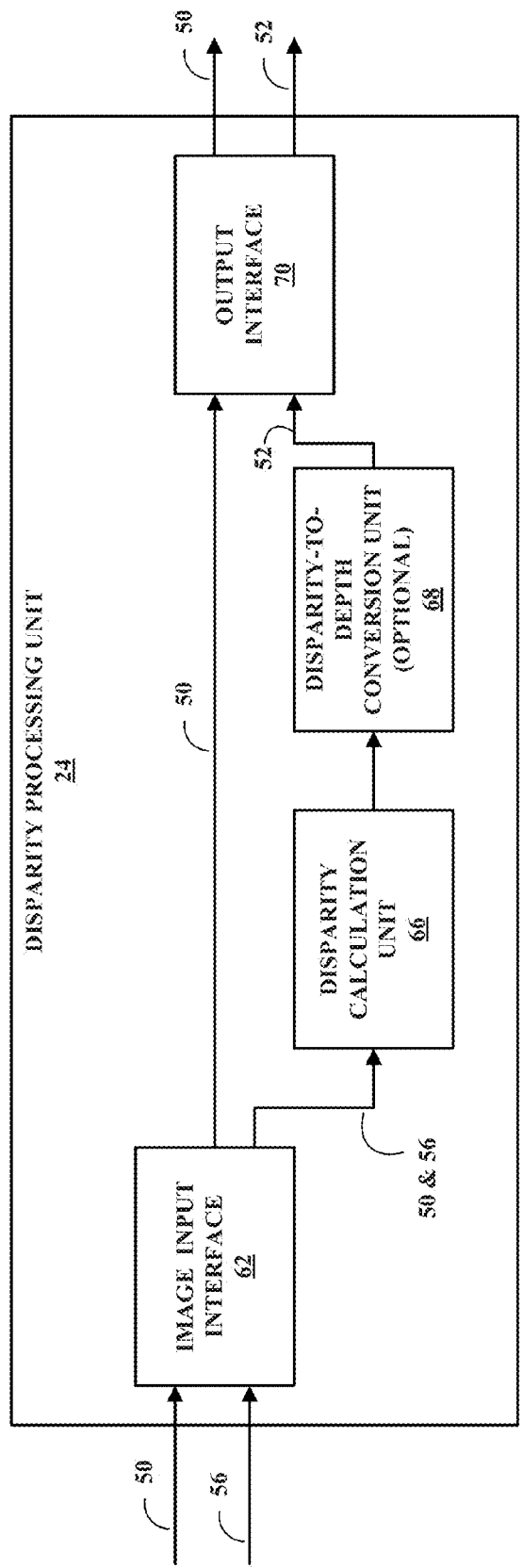
FIG. 2 is a block diagram illustrating an example arrangement of components of a disparity processing unit.

FIG. 2 is a block diagram illustrating an example arrangement of components of disparity processing unit 24. Disparity processing unit 24 may be implemented in hardware, software, firmware, or any combination thereof. When implemented in software and/or firmware, destination device 20 may include hardware for executing the software, such as, for example, one or more processors or processing units. Any or all of the components of disparity processing unit 24 may be functionally integrated.

In the example of FIG. 2, disparity processing unit 24 includes an image input interface 62 for receiving a stereo pair of images including a first view 50 and a second view 56 from an image source. Disparity calculation unit 66 may calculate disparity values for pixels of the stereo image pair 50 and 56, based on techniques described in this disclosure, and may store the disparity values as a disparity map. The disparity map may optionally be converted to a depth map by a disparity-to-depth conversion unit 68 using any of the various techniques known in the art for determining depth information based on disparity information. Thus, whenever the present disclosure discusses encoding, decoding, or transmitting disparity information, it is also contemplated that depth information based on the disparity information might be encoded, decoded, or transmitted instead. An output interface 70 can be configured to pass the first view 50 of the stereo pair 50 and 56 and the 3D processing information 52 comprising either a disparity map or a depth map to an encoder 26.

Although the examples of FIGS. 1 and 2 generally discuss aspects of the present disclosure being implemented by disparity processing unit 24 at source device 20, a disparity processing unit functionally equivalent to disparity processing unit 24 may be located at destination device 40 or in a third-party device separate from source device 20 and destination device 40. In an example of an alternative configuration of FIG. 1, source device 20 might transmit encoded image data 54 that includes first view 50 and second view 56 to destination device 40, and a disparity processing unit functionally equivalent to disparity processing unit 24 might calculate 3D processing information 52 at destination device 40. Destination device 40 may use the 3D processing information for purposes such as image refinement or adjusting user preferences.

Figure 3A:
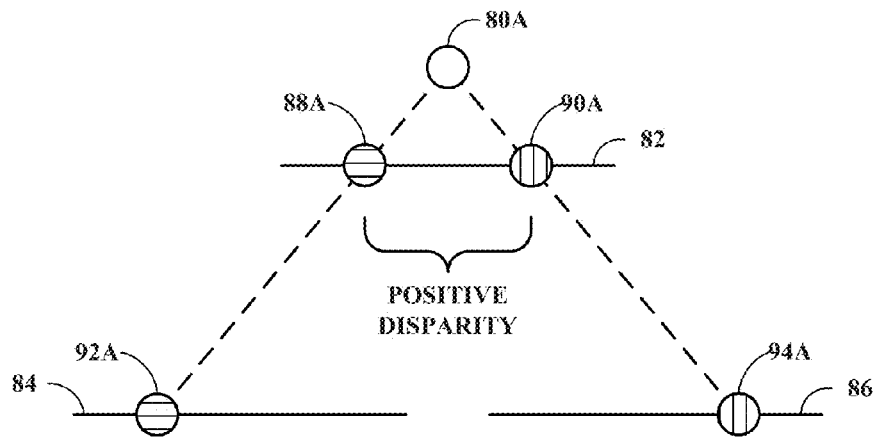
FIGS. 3A-3C are conceptual diagrams illustrating examples of positive, zero, and negative disparity values, respectively, based on depths of pixels.
Figure 3B:
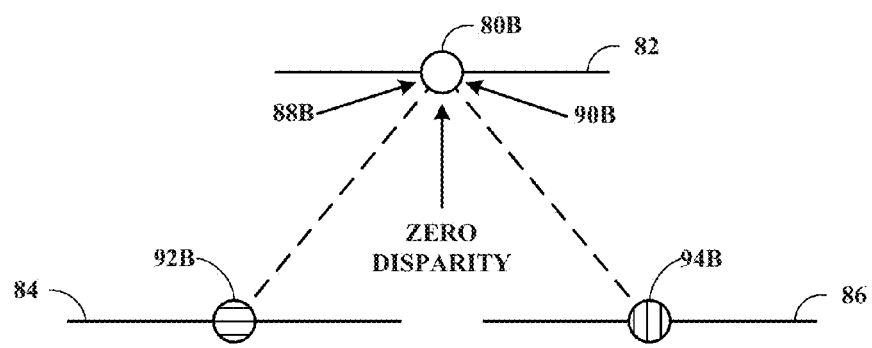
Figure 3C:
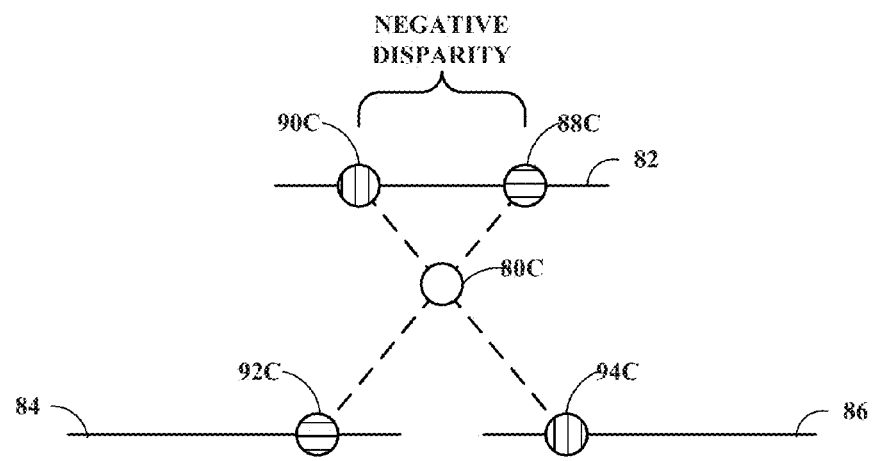

FIGS. 3A-3C are conceptual diagrams illustrating examples of positive, zero, and negative disparity values based on depths of pixels. In general, to create a three-dimensional effect, two images are shown, e.g., on a screen, and pixels of objects that are to be displayed either in front of or behind the screen have positive or negative disparity values, respectively, while objects to be displayed at the depth of the screen have disparity values of zero. In some examples, e.g., when a user wears head-mounted goggles, the depth of the "screen" may instead correspond to a common depth $d_0$.

The examples of FIGS. 3A-3C illustrate examples in which screen 82 displays left image 84 and right image 86, either simultaneously or in rapid succession. FIG. 3A illustrates an example for depicting pixel 80A as occurring behind (or inside) screen 82. In the example of FIG. 3A, screen 82 displays left image pixel 88A and right image pixel 90A, where left image pixel 88A and right image pixel 90A generally correspond to the same object and thus may have similar or identical pixel values. In some examples, luminance and chrominance values for left image pixel 88A and right image pixel 90A may differ slightly to further enhance the three-dimensional viewing experience, e.g., to account for slight variations in illumination or color differences that may occur when viewing an object from slightly different angles.

The position of left image pixel 88A occurs to the left of right image pixel 90A when displayed by screen 82, in this example. That is, there is positive disparity between left image pixel 88A and right image pixel 90A. Assuming the disparity value is d, and that left image pixel 92A occurs at horizontal position x in left image 84, where left image pixel 92A corresponds to left image pixel 88A, right image pixel 94A occurs in right image 86 at horizontal position x+d, where right image pixel 94A corresponds to right image pixel 90A. This positive disparity may cause a viewer's eyes to converge at a point relatively behind screen 82 when the user's left eye focuses on left image pixel 88A and the user's right eye focuses on right image pixel 90A, creating the illusion that pixel 80A appears behind screen 82.

Left image 84 may correspond to first image 50 as illustrated in FIGS. 1 and 2. In other examples, right image 86 may correspond to first image 50. In order to calculate the positive disparity value in the example of FIG. 3A, view synthesizing unit 44 may receive left image 84 and a depth value for left image pixel 92A that indicates a depth position of left image pixel 92A behind screen 82. View synthesizing unit 44 may copy left image 84 to form right image 86 and change the value of right image pixel 94A to match or resemble the value of left image pixel 92A. That is, right image pixel 94A may have the same or similar luminance and/or chrominance values as left image pixel 92A. Thus screen 82, which may correspond to image display 42, may display left image pixel 88A and right image pixel 90A at substantially the same time, or in rapid succession, to create the effect that pixel 80A occurs behind screen 82.

FIG. 3B illustrates an example for depicting pixel 80B at the depth of screen 82. In the example of FIG. 3B, screen 82 displays left image pixel 88B and right image pixel 90B in the same position. That is, there is zero disparity between left image pixel 88B and right image pixel 90B, in this example. Assuming left image pixel 92B (which corresponds to left image pixel 88B as displayed by screen 82) in left image 84 occurs at horizontal position x, right image pixel 94B (which corresponds to right image pixel 90B as displayed by screen 82) also occurs at horizontal position x in right image 86.

View synthesizing unit 44 may determine that the depth value for left image pixel 92B is at a depth $d_0$ equivalent to the depth of screen 82 or within a small distance δ from the depth of screen 82. Accordingly, view synthesizing unit 44 may assign left image pixel 92B a disparity value of zero. When constructing right image 86 from left image 84 and the disparity values, view synthesizing unit 44 may leave the value of right image pixel 94B the same as left image pixel 92B.

FIG. 3C illustrates an example for depicting pixel 80C in front of screen 82. In the example of FIG. 3C, screen 82 displays left image pixel 88C to the right of right image pixel 90C. That is, there is a negative disparity between left image pixel 88C and right image pixel 90C, in this example. Accordingly, a user's eyes may converge at a position in front of screen 82, which may create the illusion that pixel 80C appears in front of screen 82.

View synthesizing unit 44 may determine that the depth value for left image pixel 92C is at a depth that is in front of screen 82. Therefore, view synthesizing unit 44 may execute a function that maps the depth of left image pixel 92C to a negative disparity value −d. View synthesizing unit 44 may then construct right image 86 based on left image 84 and the negative disparity value. For example, when constructing right image 86, assuming left image pixel 92C has a horizontal position of x, view synthesizing unit 44 may change the value of the pixel at horizontal position x−d (that is, right image pixel 94C) in right image 86 to the value of left image pixel 92C.

Figure 4A:
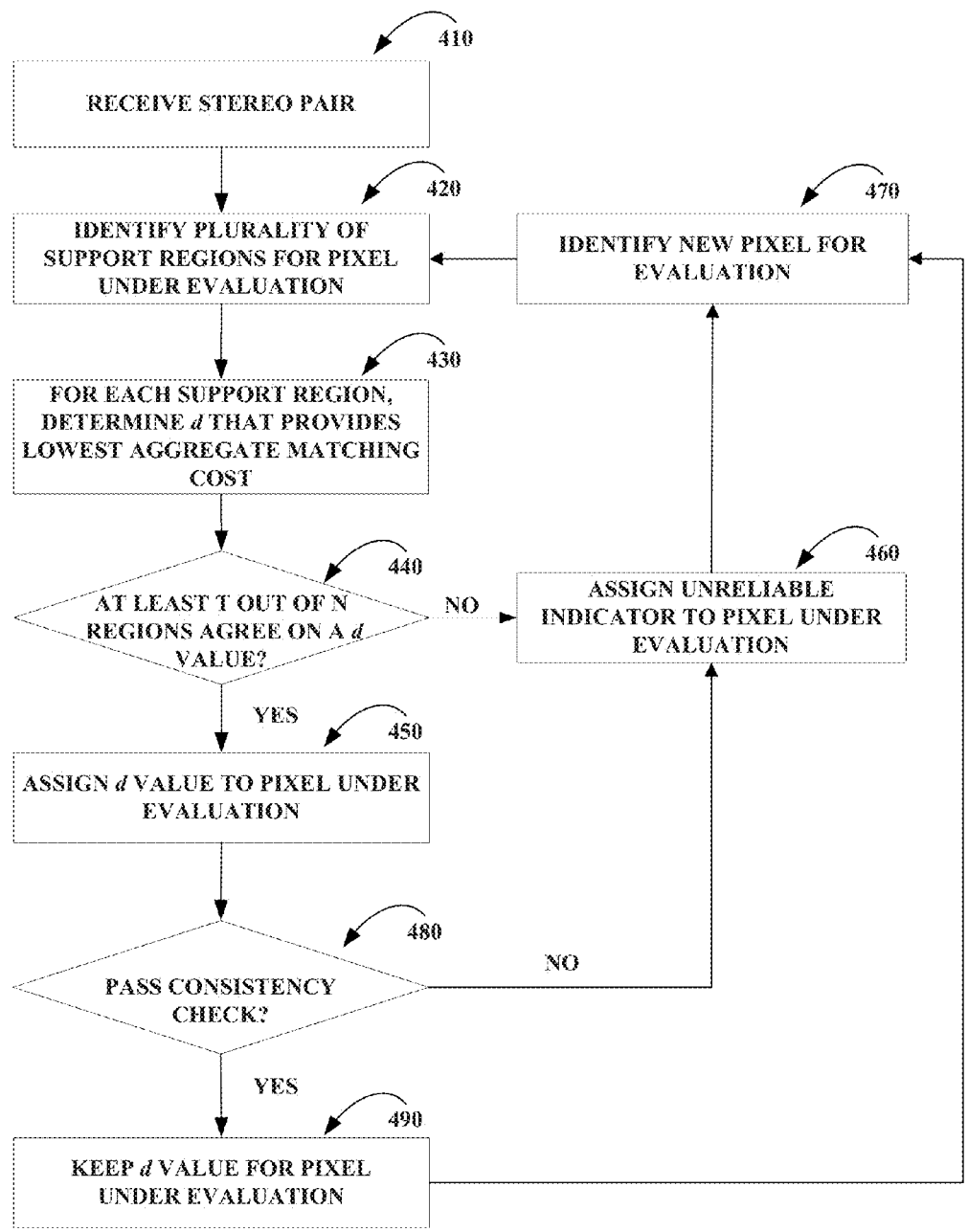
FIGS. 4A-4C are flowcharts illustrating example methods for calculating disparity values for corresponding pixels in a stereo pair of images.

FIG. 4A is a flowchart showing a method containing aspects of the present disclosure. The method will be described with reference to the components of FIGS. 1 and 2. Disparity processing unit 24 receives a stereo pair of images from image source 22 (block 410). The stereo pair of images includes a first image 50 (also referred to as first view 50) and a second image 56 (also referred to as second view 56). First image 50 and second image 56 are different views of a common scene and form a stereo image pair. For a pixel under evaluation in first image 50, which may also be referred to as a reference image, disparity calculation unit 66 identifies a plurality of support regions (block 420). Each support region includes a group of pixels around the pixel under evaluation and is typically a window (normally a square region, but not necessarily a square region) that surrounds the pixel under evaluation. Aspects of the present disclosure include using multiple support regions (i.e. multiple windows) of different sizes.

For each support region, disparity calculation unit 66 determines a disparity value (d) that provides a lowest aggregated matching cost (AMC) (block 430). The matching cost function is a pixel-based error function that measures a pixel value difference between two pixels, and the AMC is a difference between pixel values of pixels in first image 50 and second image 56. As used in this disclosure, the term pixel value may refer, for example, to any color value such as a red, blue, or green value or an RGB value in a RGB model or to an intensity value such as a luma value or a chroma value in a chroma subsampling model.

Aspects of the present disclosure may include using an absolute difference (AD) function to calculate matching cost (C) to lessen computational complexity, such that:

$$C(i,j,d) = |r(i,j) - t(i \pm d, j)| \quad (1)$$

where r(i, j) and t(i, j) are the pixel values of the pixels at coordinates (i, j) for the reference (r) image (i.e. first image 50 in this example) and the target (t) image (i.e. second image 56 in this example), respectively; and d is the disparity towards the left (i.e. negative disparity) or the right (i.e. positive disparity) of the reference image, when this image corresponds to the right or the left images of the stereo pair, respectively. The AMC ($C_n$(x, y, d)) for a square window of odd size [−n/2, n/2] and a given disparity d is as follows:

$$c_n(x, y, d) = \sum_{-\frac{n}{2} \leq i \leq \frac{n}{2}} \sum_{-\frac{n}{2} \leq l \leq \frac{n}{2}} c(x+i, y+j \pm d) \quad (2)$$

If T out of N total support regions determine the same value for D that provides the lowest AMC (block 440, "yes" path), then disparity calculation unit 66 considers this disparity value to be reliable and assigns this disparity value to a disparity value indicator for the pixel under evaluation (block 450). Otherwise (block 440, "no" path), disparity calculation unit 66 sets the disparity value indicator for the pixel under evaluation to an indicator of unreliability and further processing is needed to determine a disparity value for that pixel (block 460). In other words, if the number of support regions having the same disparity value is greater than a threshold number, then disparity calculation unit 66 assigns that same disparity value to a disparity value indicator for the pixel under evaluation, and if the number of support regions having the same value is not greater than a threshold number, then disparity calculation unit 66 sets the disparity value indicator to a value indicating unreliability and performs further processing to determine a disparity value for the pixel under evaluation.

To obtain occluded areas, i.e., areas that are only visible on one of the images, a uniqueness constraint, also referred to as a consistency check, can be used (block 480). The consistency check of block 480 may be performed at a variety of times during the process of determining disparity values. For example, the consistency check of block 480 may be performed for pixels of a line, after all pixels in the line have been assigned disparity values or may be performed intermittently while pixels of the line are being assigned disparity values. Disparity calculation unit 66 compares the disparity value of a pixel under evaluation in the first image to a disparity value of a corresponding pixel in a second image to determine if the pixel under evaluation is an occluded pixel. If the disparity value of the pixel under evaluation and the disparity value of the corresponding pixel are the same, i.e. passing the consistency check, (block 480, yes), then disparity calculation unit 66 keeps the disparity value as is (block 490). If the disparity value of the pixel under evaluation is different than the disparity value of the corresponding pixel, i.e. not passing the consistency check, (block 480, no), then disparity calculation unit 66 sets the disparity value indicator for the pixel under evaluation to a value indicating the pixel is unreliable (block 460).

Ideally, the disparity values determined at block 450 would always be accurate and only occluded areas would be detected using the consistency check, but as a practical matter, the consistency check (block 480) can also detect errors introduced during the process of determining disparity values and can provide a second chance to correct those errors. Although this disclosure may refer to pixels that do not pass the consistency check as unreliable, it is to be understood that the pixels may either be unreliable or correspond to occluded areas.

After the consistency check, it is possible that not all the pixels will have an assigned disparity value because some pixels might have disparity values identified as unreliable due to inconsistency (e.g. block 480, no) or due to not enough support regions agreeing on a disparity value (e.g. block 440, no). Disparity calculation unit 66 can perform further processing, as described in relation to FIGS. 4B and 4c, to determine disparity values for these unreliable pixels.

Setting the disparity value indicator can comprise a mapping operation, a data storing operation, or any other technique known in the art suitable for associating a plurality of data values. After the pixel under evaluation is either assigned a disparity value or identified as unreliable, then a new pixel for evaluation can be identified (block 470), and the process for determining a disparity value can be repeated.

Due to the noise present in images, the pixel value of a pixel in an image is a random variable with additive noise that can be modeled as white noise. As a consequence of noise in images, the matching cost function is noisy as well. Aspects of the present disclosure may advantageously result in noise being removed by averaging the results of multiple matching cost functions that include the noise contributions of neighboring pixels, which define the region of support. Selection of the region of support and the weights associated to the contribution of the neighbors can, for example, be based on the relative distance to the pixel under evaluation or based on the image content.

Out of several disparity values associated with each one of the support regions, only one needs to be selected. There are several potential ways to combine the information provided by the aggregated cost for each disparity at any given pixel, for several windows. For example, the aggregated cost for several windows can be linearly combined according to a weighting factor obtained from analyzing the reliability of each, based on the analysis of the minima of this function. This approach requires a one-dimensional functional analysis for each window and each pixel, and the weights rely on certain heuristics. Alternatively, a winner-takes-all approach can be used, where for all windows the overall minimum aggregated cost decides the disparity value, with no information on how reliable this value is.

Aspects of the present disclosure include selecting the disparity according to a voting process. If T out of N total windows agree on the value of the disparity that provides the lowest AMC, then this agreed upon value is considered reliable, and the agreed upon disparity value is assigned to the pixel under evaluation. Otherwise, no value is assigned and an additional disparity refinement processes is used to assign a value. That is, if $$h = \max\left(hist\left(d_n = \min_{d_i} C_n(x, y, d_i), \text{ for } n = 0, \ldots, N\right)\right) > T, \quad (3)$$

where hist refers to the histogram of disparities associated with the minimum aggregated cost for each window, then the disparity related to the maximum of the histogram is assigned to the pixel under evaluation. Otherwise, this pixel under evaluation is marked as unreliable.

The voting approach of the present disclosure can behave as a robust estimator that counts the number of windows that agree on the assigned disparity value for a given pixel, and only if this number is above a threshold value, is the disparity value considered reliable. As described in more detail below in relation to FIGS. 4B and 4C, a disparity refinement process can be used to assign a disparity value to pixels assigned an indicator of unreliability during the disparity computation method of FIG. 4A, described above.

Figure 4B:
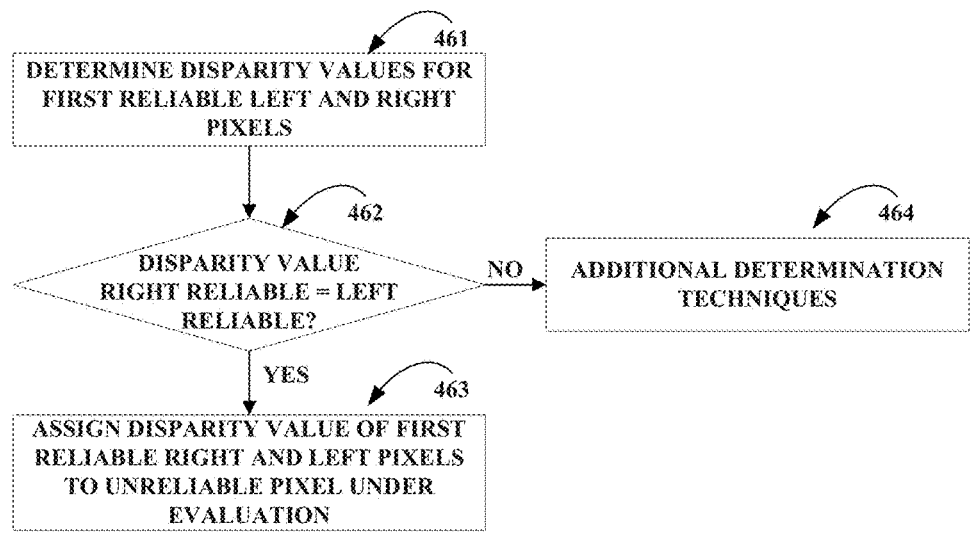

FIG. 4B is a flow chart illustrating a method for assigning disparity values to those pixels identified as unreliable at block 460 of the method of FIG. 4A. The method will be described with reference to the components of FIGS. 1 and 2. For pixels identified as unreliable, disparity calculation unit 66 determines the first reliable disparity value to the left of an unreliable pixel under evaluation and the first reliable disparity value to the right of the unreliable pixel under evaluation (block 461). If the first reliable disparity value to the left of the unreliable pixel under evaluation is the same as the first reliable disparity value to the right of the unreliable pixel under evaluation (block 462, yes), then disparity calculation unit 66 sets the disparity value indicator for the unreliable pixel under evaluation to the disparity value of the first reliable right and left pixels (block 463). If the disparity value of the first reliable left pixel and the first reliable right pixel are not the same (block 462, no), then disparity calculation unit 66 uses additional disparity determination techniques to determine a disparity value for the unreliable pixel under evaluation (block 464).

Figure 5:
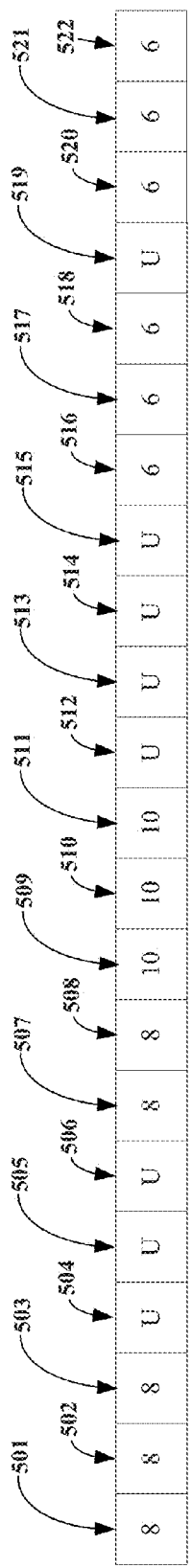
FIG. 5 is a graphical representation of a line of pixels and disparity values.

FIG. 5 is a representation of a line of pixels in an image. Boxes 501-522 represent pixels, and the numbers inside the boxes represent disparity values for those pixels. "U" represents an unreliable disparity value. In accordance with the techniques of FIG. 4B, for a pixel identified as unreliable, such as pixel 505, a first reliable left disparity value (pixel 503) and a first reliable right disparity value (pixel 507) can be identified. In this example, because the first reliable left disparity value and first reliable right disparity value are the same, in this case 8, the disparity value for the pixel under evaluation, pixel 505, would be changed to 8. For a different pixel under evaluation, such as pixel 513, where the first reliable left disparity value (pixel 511) and first reliable right disparity value (pixel 516) are not the same, the pixel under evaluation, pixel 513, would be kept as unreliable until additional determination techniques are used to determine a reliable disparity value. A single unreliable pixel or groups of consecutive unreliable pixels, such as pixels 504-506 and pixels 512-515, can be referred to as holes. The techniques of FIG. 5 can be used to set all the pixels of a hole between same reliable disparity values, such as the hole of pixels 504-506, to the disparity value of first reliable left and right pixels.

The additional determination techniques of block 464 can include disparity calculation unit 66 performing one of several additional determination techniques. Examples of additional determination techniques that may be computationally inexpensive compared to other techniques include, for example, disparity calculation unit 66 assigning the first reliable right disparity value to an unreliable pixel or assigning the first reliable left disparity value to an unreliable pixel. Another technique may include disparity calculation unit 66 assigning the higher of the first reliable right disparity value and the first reliable left disparity value or assigning the lower of the first reliable left disparity value or the first reliable right disparity value to the pixel under evaluation.

Another additional determination technique includes disparity calculation unit 66 using the first reliable right disparity value and the first reliable left disparity value to determine a lowest ACM for a support region. For a pixel under evaluation that has previously been identified as unreliable, disparity calculation unit 66 can identify a small window, such as 5×5, as a support region for the pixel under evaluation and determine which of the first reliable left disparity value and the first reliable right disparity value produces that lowest ACM for the support region, and assign that disparity value to the pixel under evaluation. Only considering a first reliable left disparity value and first reliable right disparity value in a single window may produce a more accurate disparity map than the aforementioned techniques, while still being computationally less expensive compared to other techniques.

Figure 4C:
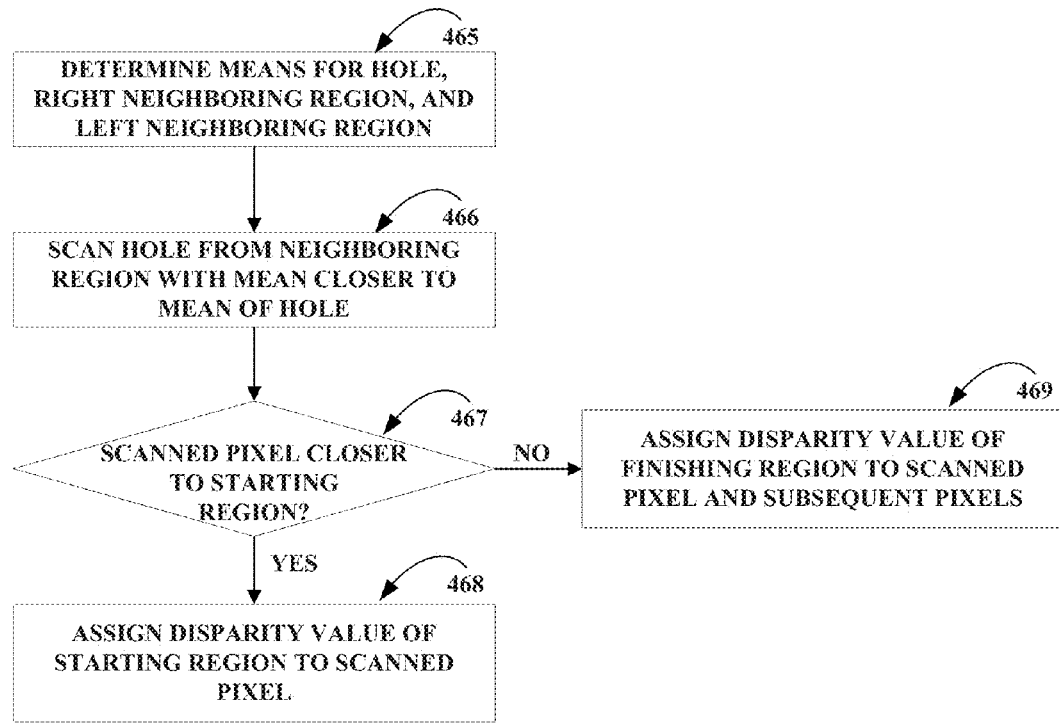

FIG. 4C is a flow diagram of another additional technique for disparity calculation unit 66 to assigning disparity values to pixels identified as unreliable. The additional technique may, for example, be performed as part of the additional determination techniques of block 464. The method will be described with reference to the components of FIGS. 1 and 2. The techniques of FIG. 4C include using object transition detection to detect where a particular object in an image begins or ends. For a hole, such as pixels 512-515, disparity calculation unit 66 can determine a mean of the pixel values for the left neighboring region, right neighboring region, and the hole (block 465). The neighboring regions refer to the groups of pixels with a common disparity value to the right and to the left of the hole. Using FIG. 5 as an example, the left neighboring region to the hole of pixels 512-515 would be pixels 509-511, and the right neighboring region to the hole of pixels 512-515 would be pixels 516-522. Pixel 519, which is identified as unreliable on FIG. 5, could have its disparity value changed to 6 based on the techniques described relative to FIG. 4B. The type of pixel value used for obtaining the mean of the hole, left neighboring region, and right neighboring region may be the same pixel value used in the matching cost calculations discussed above but does not necessarily need to be the same pixel value. For example, aspects of the present disclosure could be implemented using an RGB value for determining matching costs and a chroma or luma value for determining means, or vice versa.

Various techniques can be used to calculate the mean for a hole and neighboring regions (collectively referred to as regions). Some techniques may include averaging all pixel values for the pixels in a region, while other techniques may exclude outliers, i.e. pixels with intensity values that vary significantly from the other pixel values in the region. One example technique for determining means for a region includes computing a histogram of intensity values for the pixels in the region and including in the mean, only those pixels with pixels values greater than a certain percentage, such as 50%, of the maximum value of the histogram, where the histogram is a probability distribution of the pixel values in the region and the maximum value of the histogram represents the most frequently occurring pixel value in the region.

Starting with the neighboring region with a mean closer to the mean of the hole, disparity calculation unit 66 can scan the unreliable pixels of the hole to determine if the pixel value of a scanned pixel is closer to the mean of the region from which the scan started or closer to the mean of the region towards which the scan is progressing (block 466). If the scanned pixel has a pixel value closer to the mean of the region from which the scan started, i.e. starting region, (block 467, yes), then disparity calculation unit 66 can assign the disparity value of the starting region to the scanned pixel (block 468). If the scanned pixel has a pixel value closer to the mean of the region towards which the scan is progressing, i.e. the finishing region, (block 467, no), then disparity calculation unit 66 can assign the disparity value of the finishing region to the scanned pixel, and to subsequent pixels in the hole (block 469).

Again, using FIG. 5 as an example, for a hole (pixels 512-515), if the mean of the left neighboring region (pixels 509-511) is closer to the mean of the hole than is the mean of the right neighboring region (pixels 516-522), then the scan can start at pixel 512 and progress towards pixel 515. Once a scanned pixel is identified with a pixel value closer to the mean of region towards which the scan is progressing, which is the right neighboring region in this particular example, then the disparity value for the scanned pixel and subsequent pixels can be set to the disparity value of the right neighboring region. For example, if the scan starts at pixel 512 and the pixel value of pixel 513 is closer to the mean of the right neighboring region than to the mean of the left neighboring region, then pixels 513-515 can all be assigned the disparity value of the right neighboring region, which in this example is 6.

If the mean of the right neighboring region is closer to the mean of the hole than is the mean of the left neighboring region, then the scan can start at pixel 515 and progress towards pixel 512. Once a scanned pixel is identified with a pixel value closer to the mean of region towards which the scan is progressing, which is the left neighboring region in this particular example, then the disparity value for the scanned pixel and subsequent pixels can be set to the disparity value of the left neighboring region. For example, if the scan starts at pixel 515 and the pixel value of pixel 513 is closer to the mean of the left neighboring region than to the mean of the right neighboring region, then pixels 513 and 512 can be assigned the disparity value of the left neighboring region, which in this example is 10.

Aspects of the present disclosure may include real-time implementable methods that may produce disparity maps accurate enough to use as input for a disparity-based image rendering engine, such as view synthesizing unit 44 of FIG. 1. In order to reduce computational cost, aspects of the present disclosure include utilizing multi-resolution pyramidal decomposition approach, where the lower level of a pyramid represents the original resolution image, and each additional level is a dyadic sub-sampled version of the image in the previous level. In a dyadic sub-sampled version of an image, a pixel from a higher resolution image is removed so that one pixel at a higher level of the pyramid represents two pixels at the level immediately below the higher level. The processes described above in relation to FIGS. 1, 2, 3A-C, and 4A-C, can be implemented at every level of the pyramid, usually starting at a lower resolution first and then at a higher resolutions.

Figure 6:
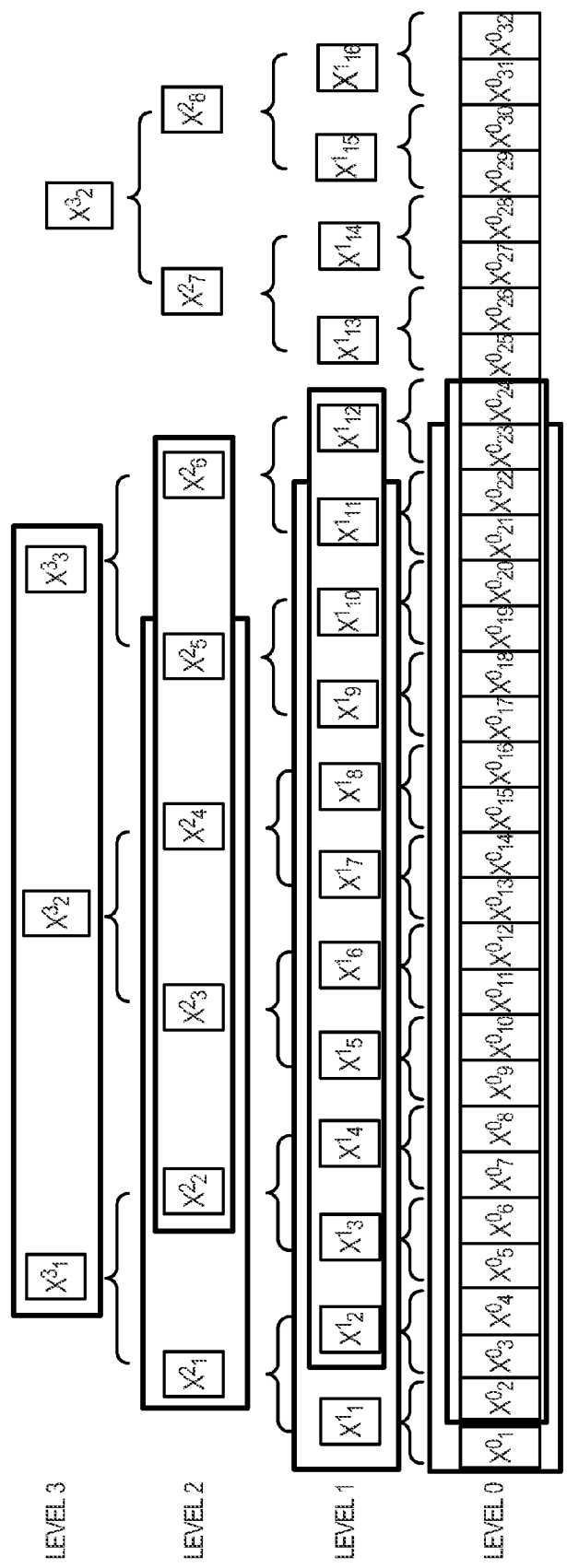
FIG. 6 is a diagram illustrating examples of related windows at different pyramidal levels.

FIG. 6 shows a conceptual diagram of the different levels of a pyramid. Level 0 represents a full resolution image with each of $x^0_1$, $x^0_2$, $x^0_3$, $x^0_4$ etc. representing a pixel of the full resolution image. Levels 1, 2, and 3 represent lower resolution, or downsampled, versions of the full resolution image of Level 0. At Level 1, for example, pixels $x^1_1$ and $x^1_2$ may correspond to pixels $x^0_1$ and $x^0_3$ at Level 0, with pixels $x^0_2$ and $x^0_4$ removed during down sampling. Therefore, Level 1 has one-half the resolution of Level 0. In the pyramid shown at FIG. 6, Level 2 has one-half the resolution of Level 1, and Level 3 has one-half the resolution of Level 2, thus Level 3 has one-eighth the resolution of Level 0.

Aspects of the present disclosure can be implemented at every level of the pyramid, starting from high (i.e. Level 3, low resolution) to low (i.e. Level 0, high resolution). However, decisions made at higher levels of the pyramid can be used to simplify the computations of lower levels. For example, the techniques of FIGS. 4A-C may, for example, be applied at a low resolution image corresponding to Level 3 of FIG. 6 to determine disparity values for some of pixels $x^3_1$, $x^3_2$, $x^3_3$, etc. The techniques of FIGS. 4A-C may further be applied to a higher resolution image corresponding to Level 2 to determined disparity values for $x^2_1$, $x^2_2$, $x^2_3$, etc., but using reliable disparities determined at Level 3, the computations needed to determine disparity values $x^2_1$, $x^2_2$, $x^2_3$, etc., may be reduced.

At the highest level, the disparities range from 0 to $D/2^{(L-1)}$, where D represents a maximum disparity value and L represents the level. At following levels and all the way down to the lowest level, the assigned disparities are scaled and refined within a range of three to six values centered on the estimated disparity. This refinement is a direct consequence of the granularity related to any subimage. In other words, assigning a disparity value of d to a pixel at a given level means that d−1 and d+1 are ruled out as a solution for that pixel at that given level. At the next lower level, d maps to 2d, (d−1) to (2d−2), and (d+1) to (2d+2). Therefore, it can be assumed that (2d+2) and (2d−2) are not disparity values at the lower level, but it is still uncertain whether 2d−1 or 2d+1 are a better solution than 2d because this level of granularity was not available at the higher level.

As an example, assume a disparity value of $d_1=8$ is determined for pixel $x^3_1$ at Level 3 of FIG. 6 and a disparity value of $d_2=9$ is determined for pixel $x^3_2$ at Level 3 of FIG. 6, and assume pixels $x^2_1$ and $x^2_3$ correspond to pixels $x^3_1$ and $x^3_2$, respectively and were not removed during downsampling. If pixel $x^3_1$ corresponds to pixel $x^2_1$, then the disparity value $d_1$ can be mapped to pixel $x^2_1$ at Level 2. Due to the doubling of the resolution from Level 3 to Level 2, the disparity value for $x^3_1$ is doubled to 16 at Level 2 for pixels $x^2_1$. It is unclear, however, if the disparity value of $x^2_1$ might actually be 15 or 17 instead of 16 because that level of granularity was not available at Level 3. Similarly, if pixel $x^3_2$ corresponds to pixel $x^2_3$ of Level 2, then the disparity value for pixel $x^2_3$ can be chosen from the values of $2*d_2\pm1$ (i.e. 17, 18, and 19).

Thus, the techniques for determining disparity values described above in relation to FIGS. 1, 2, 3A-C, and 4A-B can be performed on pixels $x^2_1$ and $x^2_3$ of Level 2, but because it is known that the disparity value is limited to one of three values, the computations needed to determine a disparity value for $x^2_1$ and $x^2_3$ may be reduced.

Assuming, for example, that unlike pixels $x^2_1$ and $x^2_3$, pixel $x^2_2$ corresponds to a pixel removed during downsampling, then instead of limiting the disparity value to three possible disparity values based on $x^2_1$ and $x^2_3$, the possible disparity values can be limited to the union of disparity values for $x^2_1$ and $x^2_3$, which in this example would be 15, 16, 17, 18, and 19.

At each level of the pyramid other than the highest level, the refinement process may reduce computations by only evaluating three to six potential disparity values, which may result in significant computational savings compared to a single-resolution approach where disparity values are determined directly on the high resolution image, represented by Level 0. Using again the example of $d_1=8$ for pixel $x^3_1$, the value $d_1=8$ might be determined in accordance with the methods described above in relation to FIG. 4A-C, in particular block 460 and equations 1 and 2. To determine the disparity value for pixel $x^3_1$, as many as 16 potential values of d might need to be evaluated using equations 1 and 2 before a reliable disparity value for pixel $x^3_1$ is identified. Once the reliable disparity value for pixel $x^3_1$ ($d_1=8$ in this example) is identified, however, disparity values for pixel $x^2_1$ and pixel $x^2_2$ can be evaluated using a limited number of possible disparity values. In this example, pixel $x^2_1$ can be evaluated using only three possible disparity values and pixel $x^2_2$ can be evaluated using only five possible disparity values. Thus, the methods of FIG. 4A-C can be applied at all levels of the pyramid, but at lower levels of the pyramid, the number of potential disparity values evaluated, and thus the total number of computations for determining a reliable disparity value, may be significantly reduced.

After the consistency check at each level of the pyramid, it is possible that not all the pixels will have an assigned and refined disparity value, because some pixels might have disparity values that may have been identified as unreliable. At the lowest level of the pyramid (L0), after the consistency check, the unassigned pixels should correspond to half-occluded areas. Therefore, those pixels should correspond to background content, and thus, can be assigned the lowest of the disparities between their left and right closest pixels.

For certain applications, the disparity values determined at any intermediate level of the pyramid may be sufficiently accurate, thus reducing the amount of required memory and computation. Likewise, the multi-resolution approach of this disclosure is also well suited to trade-off quality and computational speed, in the sense that any intermediate pyramidal level can be defined as the final outcome, for an application that becomes time-constrained or otherwise does not have the resources to analyze the images at full resolution. Therefore, aspects of the present disclosure may be adaptable to applications with a variety of available processing resources for real-time applications.

The methods described above in relation to FIGS. 4A-C can first be applied on a low resolution image, such as that represented by Level 3, and can then be applied to the subsequent levels of the pyramid. The multi-resolution pyramidal technique can be computationally efficient and may produce an increase in reliable estimates of disparity values due to the regularizing effect, and removal of white noise, introduced by sub-sampling the image.

Window-based processing normally assumes an odd-sized window [k−w, k+w], so that the result of the processing is assigned to the central element, k, in the window. In a dyadic multi-resolution decomposition of the image, any given window doubles its size as the level of the pyramid decreases. A way to preserve odd windows across the pyramid is to assume that w doubles as the pyramid level decreases. Therefore, an odd-sized window [k−w, k+w] at a higher level of the pyramid is equivalent to an odd-sized window [k−2w, k+2w] at the next lowest level of the pyramid. For example, a 3×3 window centered at [k, k] at Level 3 would cover the same portion of the image as a 5×5 window centered at [k, k] at Level 2, a 9×9 window centered at [k, k] at Level 1, and 17×17 window centered at [k, k] at Level 0. A 5×5 window centered at [k, k] at Level 3 would cover the same portion of the image as a 9×9 window centered at [k, k] at Level 2, a 17×17 window centered at [k, k] at Level 1, and 33×33 window centered at [k, k] at Level 0.

Computing disparity values at the lowest level of the pyramid (i.e. at the original image resolution) for a set of multi-size windows ranging from 1 to N, can be decomposed into computing disparities for a given subset of windows at each resolution level of the pyramid. Assuming odd windows, from size 3 to N, for an M×M image, and disparities ranging from 0 to D−1, the total computational cost of a "single-resolution, multi-window" approach, where O(C) refers to the computational cost related to obtaining the matching cost for a single pixel, is:

$$DM^2 \sum_{k=1}^{\left\lfloor \frac{N}{2} \right\rfloor} (2k+1)^2 O(C) \quad (4)$$

FIG. 7 shows a table of equivalent subsets of windows, with the shaded windows representing a selected window-size for a level. The numbers represent the size of a window, such that 3 corresponds to a 3×3 window, 5 corresponds to a 5×5 window, and so on. Numbers in the same column represent equivalent windows. For example, a 3×3 window at Level 4 (L4) is equivalent to a 5×5 window at L3, a 9×9 window at L2, a 17×17 window at L1, and a 33×33 window at L0. Therefore, if a 3×3 window is used at L4, the other equivalent windows do not need to be used at the lower levels. Similarly, if a 7×7 window is used at L2, then a 13×13 window and a 25×25 window do not need to be used at L1 and L0 respectively. For a multi-resolution, multi-windows approach using equivalent subsets of windows at each level as shown in the table of FIG. 7, the total computational cost is:

$$\sum_{k=0}^{L-1} \left( \sum_{i=1}^{\left\lceil \frac{(N-1)}{2^{k+2}} \right\rceil - 1} (4i+3)^2 O(C) \right) \left( \frac{M}{2^k} \right)^2 D(k) \quad (5)$$

where the pyramidal levels range from k=0 to k=(L−1), and L is the maximum value that verifies: $N/2^L \geq 1$. The number of disparities at each level is:

$$D(k) = \frac{D}{2^{L-1}}, \text{ for } k = L-1$$

$$D(k) = 3, \text{ for } k = 0, \ldots, L-2$$

The computational cost savings of the multi-resolution approach can be seen by comparing the $D*M^2$ term of equation 4 to the $(M^2/2^k)*D(k)$ term of equation 5. At full resolution, disparity values need to be determined for every pixel in the image which in an M×M image corresponds to $M^2$ total pixels. For a lower resolution image, however, the number of pixels can be significantly reduced. For example, at level k=2, the resolution in the image is $(M/4)^2$, which has one-sixteenth the total number of pixels as the original M×M image for which disparity values need to be determined. Additionally, as described above, at level k=2, the number of disparity values that need to be evaluated for each pixel is limited to three, but in a single resolution approach, the number of disparity values that need to be evaluate might be closer to 128, for example.

Figure 8A:
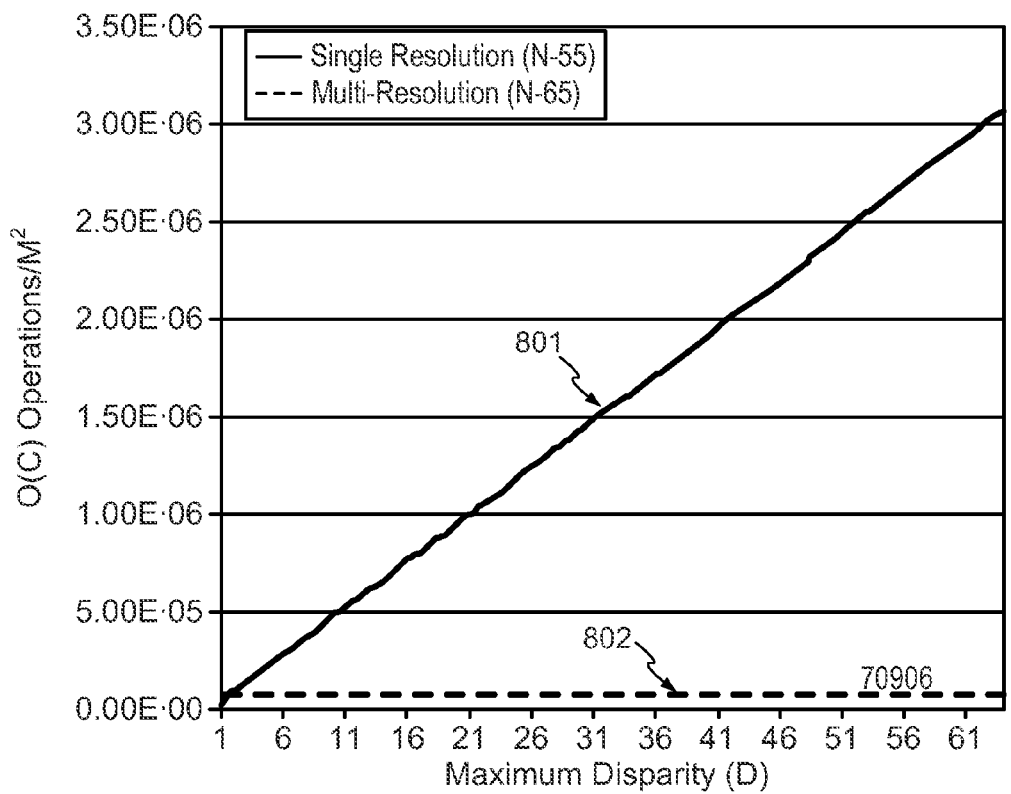
FIG. 8 shows graphs comparing the number of matching cost computations required by examples of multi-resolution approaches described in this disclosure to single resolution approaches.
Figure 8B:
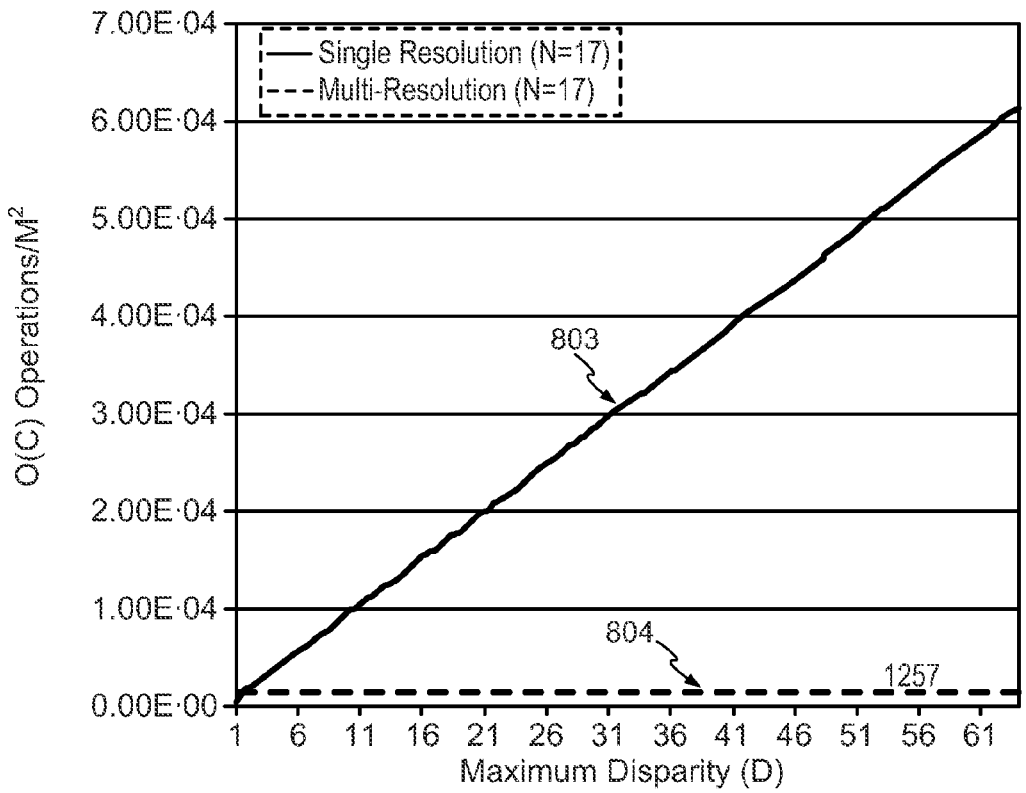

FIGS. 8A and 8B show the number of matching cost computations, O(C), required by a multi-resolution approach utilizing the techniques of this disclosure compared to a single-resolution approach, as a function of a maximum disparity value (D). The single-resolution approach is labeled 801 on FIGS. 8A and 803 on FIG. 8B, while the single-resolution approach is labeled 802 on FIGS. 8A and 804 on FIG. 8B. FIG. 8A shows the number of matching cost computations required using multi-size windows ranging from 1 to 65, and FIG. 8B shows the number of matching cost computations required using multi-size windows ranging from 1 to 17. The most noticeable aspect of the multi-resolution approach is that the cost of the multi-resolution techniques of this disclosure is near-constant as a function of a maximum disparity value, which can be of particular benefit when determining disparities for scenes with a high maximum disparity.

The techniques of this disclosure may be embodied in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units, etc.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

Many aspects of the disclosure have been described. Various modifications may be made without departing from the scope of the claims. These and other aspects are within the scope of the following claims.

The invention claimed is:

1. A method comprising:
   for a pixel under evaluation in a first image, identifying a plurality of support regions, wherein each of the support regions identifies one or more pixels around the pixel under evaluation in the first image;
   for each of the support regions, determining a disparity value that provides a lowest aggregated matching cost, wherein the aggregated matching cost is a difference between pixel values of pixels in the first image and corresponding pixels in a second image, and wherein the first image and the second image form a stereo image pair;
   in response to a number of support regions having a same disparity value being greater than a threshold number, setting a disparity value indicator for the pixel under evaluation to the same disparity value;
   in response to the pixel under evaluation being identified as unreliable, determining a first reliable right disparity value and a first reliable left disparity value;
   in response to the first reliable left disparity value not being the same as the first reliable right disparity value, determining a mean of pixel values for a hole comprising the pixel under evaluation, a mean of pixel values for a left neighboring region with the first reliable left disparity value, and a mean of pixel values for a right neighboring region with the first reliable right disparity value;
   setting a disparity value indicator for a first pixel in the hole to the first reliable left disparity value in response to a first pixel value for the first pixel being closer to the mean of pixel values for the left neighboring region than the mean of pixel values for the right neighboring region; and
   setting a disparity value indicator for a second pixel in the hole to the first reliable right disparity value in response to a second pixel value for the second pixel being closer to the mean of pixel values for the right neighboring region than the mean of pixel values for the left neighboring region.

2. The method of claim 1, further comprising:
   in response to the number of support regions having the same disparity value not being greater than a threshold number, identifying the pixel under evaluation as unreliable and performing further processing to determine a disparity value for the pixel under evaluation.

3. The method of claim 1, further comprising:
   comparing the disparity value indicator of the pixel under evaluation to a corresponding disparity value indicator for a corresponding pixel in the second image;
   in response to the disparity value indicator of the pixel under evaluation being different than the corresponding disparity value indicator, setting the disparity value indicator to a value indicating the pixel under evaluation is unreliable.

4. The method of claim 1, further comprising:
in response to the pixel under evaluation being identified as unreliable, determining a first reliable right disparity value and a first reliable left disparity value;
in response to the first reliable left disparity value being the same as the first reliable right disparity value, setting the disparity value indicator for the pixel under evaluation to the disparity value of the first reliable right disparity value and first reliable left disparity value.

5. The method of claim 1, wherein the method is first applied to lower resolution versions of the first image and the second image and then to higher resolution versions of the first image and second image, and wherein the same disparity value determined for the lower resolution versions the first image and the second image is used to determine a second disparity value for the higher resolution versions of the first image and the second image.

6. A video processing device comprising:
an image input interface configured to receive a first image and a second image, wherein the first image and the second image form a stereo image pair;
a disparity calculation unit configured to:
for a pixel under evaluation in the first image, identify a plurality of support regions, wherein each of the support regions identifies one or more pixels around the pixel under evaluation;
for each of the support regions, determine a disparity value that provides a lowest aggregated matching cost, wherein the aggregated matching cost is a difference between pixel values of pixels in the first image and corresponding pixels in the second image;
in response to a number of support regions having a same disparity value being greater than a threshold number, set a disparity value indicator for the pixel under evaluation to the same disparity value;
in response to the pixel under evaluation being identified as unreliable, determine a first reliable right disparity value and a first reliable left disparity value;
in response to the first reliable left disparity value not being the same as the first reliable right disparity value, determine a mean of pixel values for a hole comprising the pixel under evaluation, a mean of pixel values for a left neighboring region with the first reliable left disparity value, and a mean of pixel values for a right neighboring region with the first reliable right disparity value;
set a disparity value indicator for a first pixel in the hole to the first reliable left disparity value in response to a first pixel value for the first pixel being closer to the mean of pixel values for the left neighboring region than the mean of pixel values for the right neighboring region;
set a disparity value indicator for a second pixel in the hole to the first reliable right disparity value in response to a second pixel value for the second pixel being closer to the mean of pixel values for the right neighboring region than the mean of pixel values for the left neighboring region; and
an output interface configured to output a disparity map comprising the same disparity value.

7. The video processing device of claim 6, wherein the disparity calculation unit is further configured to:
in response to the number of support regions having the same disparity value not being greater than a threshold number, identify the pixel under evaluation as unreliable and perform further processing to determine a disparity value for the pixel under evaluation.

8. The video processing device of claim 6, wherein the disparity calculation unit is further configured to:
compare the disparity value indicator of the pixel under evaluation to a corresponding disparity value indicator for a corresponding pixel in the second image;
in response to the disparity value indicator of the pixel under evaluation being different than the corresponding disparity value indicator, set the disparity value indicator to a value indicating the pixel under evaluation is unreliable.

9. The video processing device of claim 6, wherein the disparity calculation unit is further configured to:
in response to the pixel under evaluation being identified as unreliable, determine a first reliable right disparity value and a first reliable left disparity value;
in response to the first reliable left disparity value being the same as the first reliable right disparity value, set the disparity value indicator for the pixel under evaluation to the disparity value of the first reliable right disparity value and first reliable left disparity value.

10. The video processing device of claim 6, wherein the disparity calculation unit is further configured to:
determine the same disparity for lower resolution versions of the first image and the second image;
use the same disparity value to determine a second disparity value for higher resolution versions of the first image and the second image.

11. An apparatus for generating three-dimensional (3D) image data, the apparatus comprising:
means for identifying a plurality of support regions for a pixel under evaluation in a first image, wherein each of the support regions identifies one or more pixels around the pixel under evaluation in the first image;
means for determining a disparity value that provides a lowest aggregated matching cost for each of the support regions, wherein the aggregated matching cost is a difference between pixel values of pixels in the first image and corresponding pixels in a second image, and wherein the first image and the second image form a stereo image pair;
means for setting a disparity value indicator for the pixel under evaluation to the same disparity value in response to a number of support regions having a same disparity value being greater than a threshold number;
means for determining a first reliable right disparity value and a first reliable left disparity value in response to the pixel under evaluation being identified as unreliable;
means for, in response to the first reliable left disparity value not being the same as the first reliable right disparity value, determining a mean of pixel values for a hole comprising the pixel under evaluation, a mean of pixel values for a left neighboring region with the first reliable left disparity value, and a mean of pixel values for a right neighboring region with the first reliable right disparity value;
means for setting a disparity value indicator for a first pixel in the hole to the first reliable left disparity value in response to a first pixel value for the first pixel being closer to the mean of pixel values for the left neighboring region than the mean of pixel values for the right neighboring region; and
means for setting a disparity value indicator for a second pixel in the hole to the first reliable right disparity value in response to a second pixel value for the second pixel being closer to the mean of pixel values for the right neighboring region than the mean of pixel values for the left neighboring region.

12. The apparatus of claim 11, further comprising:
means for identifying the pixel under evaluation as unreliable and performing further processing to determine a disparity value for the pixel under evaluation in response to the number of support regions having the same disparity value not being greater than a threshold number.

13. The apparatus of claim 11, further comprising:
means for comparing the disparity value indicator of the pixel under evaluation to a corresponding disparity value indicator for a corresponding pixel in the second image;
means for setting the disparity value indicator to a value indicating the pixel under evaluation is unreliable in response to the disparity value indicator of the pixel under evaluation being different than the corresponding disparity value indicator.

14. The apparatus of claim 11, further comprising:
means for determining a first reliable right disparity value and a first reliable left disparity value in response to the pixel under evaluation being identified as unreliable;
means for setting the disparity value indicator for the pixel under evaluation to the disparity value of the first reliable right disparity value and first reliable left disparity value in response to the first reliable left disparity value being the same as the first reliable right disparity value.

15. The apparatus of claim 11, further comprising:
means for determining the same disparity for lower resolution versions of the first image and the second image;
means for using the same disparity value to determine a second disparity value for higher resolution versions of the first image and the second image.

16. A non-transitory, computer readable storage medium tangibly storing one or more instructions, which when executed by one or more processors cause the one or more processors to:
for a pixel under evaluation in a first image, identify a plurality of support regions, wherein each of the support regions identifies one or more pixels around the pixel under evaluation in the first image;
for each of the support regions, determine a disparity value that provides a lowest aggregated matching cost, wherein the aggregated matching cost is a difference between pixel values of pixels in the first image and corresponding pixels in a second image, and wherein the first image and the second image form a stereo image pair;
in response to a number of support regions having a same disparity value being greater than a threshold number, set a disparity value indicator for the pixel under evaluation to the same disparity value;
in response to the pixel under evaluation being identified as unreliable, determine a first reliable right disparity value and a first reliable left disparity value;
in response to the first reliable left disparity value not being the same as the first reliable right disparity value, determine a mean of pixel values for a hole comprising the pixel under evaluation a mean of pixel values for a left neighboring region with the first reliable left disparity value, and a mean of pixel values for a right neighboring region with the first reliable right disparity value;
set a disparity value indicator for a first pixel in the hole to the first reliable left disparity value in response to a first pixel value for the first pixel being closer to the mean of pixel values for the left neighboring region than the mean of pixel values for the right neighboring region; and
set a disparity value indicator for a second pixel in the hole to the first reliable right disparity value in response to a second pixel value for the second pixel being closer to the mean of pixel values for the right neighboring region than the mean of pixel values for the left neighboring region.

17. The non-transitory, computer readable storage medium of claim 16 tangibly storing one or more additional instructions, which when executed by one or more processors cause the one or more processors to:
in response to the number of support regions having the same disparity value not being greater than a threshold number, identify the pixel under evaluation as unreliable and performing further processing to determine a disparity value for the pixel under evaluation.

18. The non-transitory, computer readable storage medium of claim 16 tangibly storing one or more additional instructions, which when executed by one or more processors cause the one or more processors to:
compare the disparity value indicator of the pixel under evaluation to a corresponding disparity value indicator for a corresponding pixel in the second image;
in response to the disparity value indicator of the pixel under evaluation being different than the corresponding disparity value indicator, set the disparity value indicator to a value indicating the pixel under evaluation is unreliable.

19. The non-transitory, computer readable storage medium of claim 16 tangibly storing one or more additional instructions, which when executed by one or more processors cause the one or more processors to:
in response to the pixel under evaluation being identified as unreliable, determine a first reliable right disparity value and a first reliable left disparity value;
in response to the first reliable left disparity value being the same as the first reliable right disparity value, set the disparity value indicator for the pixel under evaluation to the disparity value of the first reliable right disparity value and first reliable left disparity value.

20. The non-transitory, computer readable storage medium of claim 16 tangibly storing one or more additional instructions, which when executed by one or more processors cause the one or more processors to:
determine the same disparity for lower resolution versions of the first image and the second image;
use the same disparity value to determine a second disparity value for higher resolution versions of the first image and the second image.

* * * * *